United States Patent
Li et al.

(10) Patent No.: US 7,153,268 B2
(45) Date of Patent: Dec. 26, 2006

(54) MOTION ADAPTIVE FRAME AVERAGING FOR ULTRASOUND DOPPLER COLOR FLOW IMAGING

(75) Inventors: Yadong Li, Albany, CA (US); Richard Chiao, Issaquah, WA (US); David Dubberstein, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 47 days.

(21) Appl. No.: 10/937,529

(22) Filed: Sep. 9, 2004

(65) Prior Publication Data

US 2005/0075569 A1 Apr. 7, 2005

Related U.S. Application Data

(60) Provisional application No. 60/501,375, filed on Sep. 9, 2003.

(51) Int. Cl.
*A61B 8/06* (2006.01)
*G06K 9/00* (2006.01)

(52) U.S. Cl. ...................... 600/455; 382/128

(58) Field of Classification Search ........ 600/407–472; 73/625, 626; 367/7, 11, 130, 138; 128/916; 382/128, 162, 260–264, 272–273
See application file for complete search history.

(56) References Cited

U.S. PATENT DOCUMENTS

| | | | | |
|---|---|---|---|---|
| 5,669,387 A | * | 9/1997 | Mine | 600/455 |
| 5,976,086 A | * | 11/1999 | Matsushima | 600/443 |
| 6,364,835 B1 | * | 4/2002 | Hossack et al. | 600/443 |
| 6,490,475 B1 | | 12/2002 | Seeley et al. | 600/426 |
| 6,755,787 B1 | * | 6/2004 | Hossack et al. | 600/447 |

* cited by examiner

*Primary Examiner*—Francis J. Jaworski
(74) *Attorney, Agent, or Firm*—McAndrews, Held & Malloy, Ltd.; Peter J. Vogel; Michael A. Dellapenna (57) ABSTRACT

The present invention relates to a method and apparatus for performing motion adaptive frame averaging for ultrasound color flow images used to overcome lag and smearing alias of color due to motion. One embodiment of the present invention comprises an ultrasound machine for generating an color flow imaging responsive to moving tissue. The ultrasound system comprises a front end and at least one processor. The front-end is arranged to transmit ultrasound waves into the moving tissue, generating received signals in response to the ultrasound waves backscattered from the moving tissue. The processor is responsive to the received signals, calculating a motion factor by comparing at least one current b-mode frame with at least one previous b-mode frame, determining motion using at least the motion factor, increasing a level of frame averaging if the motion factor is below a first predetermined threshold, and decreasing the level of frame averaging if the motion factor is above a second predetermined threshold.

14 Claims, 5 Drawing Sheets

MOTION ADAPTIVE FRAME AVERAGING FOR ULTRASOUND DOPPLER COLOR FLOW IMAGING

RELATED APPLICATIONS

This application is related to, and claims benefit of and priority from, Provisional Application No. 60/501,375 filed on Sep. 9, 2003, titled "Motion Adaptive Frame Averaging for Flow Imaging", the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates generally to ultrasound. In particular, the present invention relates to motion adaptive frame averaging for color flow imaging in an ultrasound device.

Some known modes of diagnostic ultrasound imaging include B- and M-modes (used to image internal, physical structure), Doppler, and color flow (primarily used to image flow characteristics, in blood vessels for example). Ultrasound color flow mode is typically used, for example, to detect the velocity of blood flow toward/away from a transducer, essentially utilizing the same technique used in Doppler mode. Whereas Doppler mode imaging displays velocity versus time for a single selected sample volume, ultrasound color flow mode imaging displays hundreds of adjacent sample volumes simultaneously, all laid over a B-mode image and color-coded to represent each sample volume's velocity.

Using Doppler effects to measure blood flow in the heart and blood vessels, for example, is known. The amplitude of the reflected waves may be employed to produce black and white images of the moving tissue, while the frequency shift of backscattered waves may be used to measure the velocity of the backscatterers from tissue or blood. The change or shift in backscattered frequency increases when blood flows toward the transducer and decreases when blood flows away from the transducer.

Color flow ultrasound imaging may be used to provide a vivid display of both blood flow and basic anatomy. Color flow images may be produced by superimposing a color image of the flow velocity of the moving material, blood or tissue for example, over the gray scale B-mode image. The color pixels represent the flow velocity of the moving material. Frame averaging may be applied to the color pixel displays to improve signal to noise ratio (alternatively referred to as "SNR") and persistency. Frame averaging uses a newly acquired color frame and a sequence of previously acquired color frames to determine the current color frame to be displayed to the end user. Various infinite impulse response (alternatively referred to as "IIR") and finite impulse response (alternatively referred to as "FIR") filter techniques may be applied to create a display color frame using a sequence of consecutive color frames in time. Arithmetic mean operation is a simple and commonly used FIR filter techniques that may be used for calculating the display frames from the sequence of frames acquired.

One limitation associated with frame averaging in color flow ultrasound imaging is that it creates a significant amount of lag and smearing due to motion, where the motion may be caused by probe or tissue movement. Such lag and smearing of color pixels is very prominent to the user, as it often overlaps the gray scale stationary tissue background from the B-mode display. The End users often choose to reduce the level of frame averaging to avoid the lag and smearing alias. However, in reducing the level of frame averaging, the end user may lose any advantages associated with higher SNR and persistency provided by frame averaging.

BRIEF SUMMARY OF THE INVENTION

It should be appreciated that the ill effects of motion on frame average are known in other imaging modality (X-ray fluoroscopy for example). However, one or more embodiments of the present invention uses b-mode image data to detect motion in color flow imaging (using an ultrasound machine or device for example). More specifically, one or more embodiments of the present invention determine a motion factor using at least B-mode ultrasound data to quantify motion, and then use the motion factor to adjust the frame averaging. It is contemplated that the motion factor determines or measures the b-mode gray scale image change. Such change is a good estimate of the probe or tissue movement, as provided previously. In at least one embodiment, the adjustment of frame averaging may be performed dynamically and in real-time, as the update frequency is the same as the B-mode frame rate, about 10 to about 20 Hz.

One embodiment of the present invention comprises a method for performing frame averaging in a device that produces at least one color flow image. This embodiment comprises calculating a motion factor using at least b-mode data and determining motion using at least the motion factor. At least one embodiment of method comprises calculating motion factor from the b-mode image frames by comparing at least one current b-mode frame with at least one previous b-mode frame. In at least one embodiment, the current b-mode frame is compared with more than one previous b-mode frame (using an equation for example). The method further comprises adjusting the frame averaging using at least the motion factor. In at least one embodiment, an algorithm or equation may be used to perform such frame averaging. Embodiments of the present invention comprise using the motion factor to adjust the frame average level for a color display. One or more embodiments comprise determining if the motion factor is above or below a predetermined threshold. More specifically embodiments comprise determining if the motion factor is below or less than a first predetermined threshold (a low threshold for example). If the motion factor is below or less than the first predetermined threshold, the level of the frame averaging may be increased. If the motion factor is not below or less than the first predetermined threshold, embodiments comprise determining if the motion factor exceeds or is greater than a second predetermined threshold (a high threshold for example). If the motion factor is greater than or exceeds the second predetermined threshold, the level of frame averaging may be reduced to avoid at least lag and color alias caused by probe or tissue motion. It is further contemplated that, if the motion factor does not exceed the second threshold, the level of frame averaging may not be changed or affected (i.e., the frame averaging is maintained at the same level).

Embodiments are also contemplated in which one predetermined threshold may be set such that if motion factor is greater than or exceeds at least one of the predetermined threshold by a certain predetermined amount (i.e., the motion factor is at or above the second predetermined threshold by a certain amount) the frame averaging is turned off. Turning off the frame averaging may remove the lag and smearing when strong motion is present.

Another embodiment of the present invention comprises a method for performing frame averaging in an ultrasound device performing color flow imaging. This embodiment comprises calculating a motion factor by comparing at least one current b-mode frame with at least one previous b-mode frame and determining motion using at least the motion factor. The method further comprises increasing a level of frame averaging if the motion factor is below a first predetermined threshold and decreasing the level of frame averaging if the motion factor is above the first predetermined threshold.

Still another embodiment comprises an ultrasound machine for generating color flow imaging responsive to moving tissue. This embodiment comprises a front-end and at least one processor. The front end transmits ultrasound waves into the moving tissue, generating received signals in response to the ultrasound waves backscattered from the moving tissue. The at least one processor responsive to the received signals, calculates a motion factor by comparing at least one current b-mode frame with at least one previous b-mode frame, determines motion using at least the motion factor, increases a level of frame averaging if the motion factor is below a predetermined threshold, and decreases the level of frame averaging if the motion factor is above the predetermined threshold. Embodiments of the present invention are contemplated in which an ultrasound machine for generating color flow imaging responsive to moving tissue comprises a front end adapted to transmit ultrasound waves into tissue and generate received signals in response to ultrasound waves backscattered from said tissue. Further, the ultrasound system may comprise at least one processor adapted to calculate motion factor using an equation.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

In at least one embodiment of the present invention, motion adaptive frame averaging of ultrasound color flow images may be used to overcome lag and smearing alias of color pixels caused by motion. It should be appreciated that the ill effects of motion on frame average are known in other imaging modality (X-ray fluoroscopy for example). However, one or more embodiments of the present invention use b-mode image data to detect motion in color flow imaging (using an ultrasound machine or device for example). More specifically, one or more embodiments of the present invention determine a motion factor using at least B-mode ultrasound data to quantify motion, and then use the motion factor to adjust the frame averaging. In at least one embodiment, the adjustment of the frame averaging may be performed dynamically and in real-time, as the update frequency is the same as the B-mode frame rate, about 10 to about 20 Hz For the purpose of illustration only, the following detailed description references a certain embodiment of an ultrasound machine, apparatus or device. However, it is understood that the one or more embodiments of the present invention may be used with other devices or imaging systems.

Figure 1:
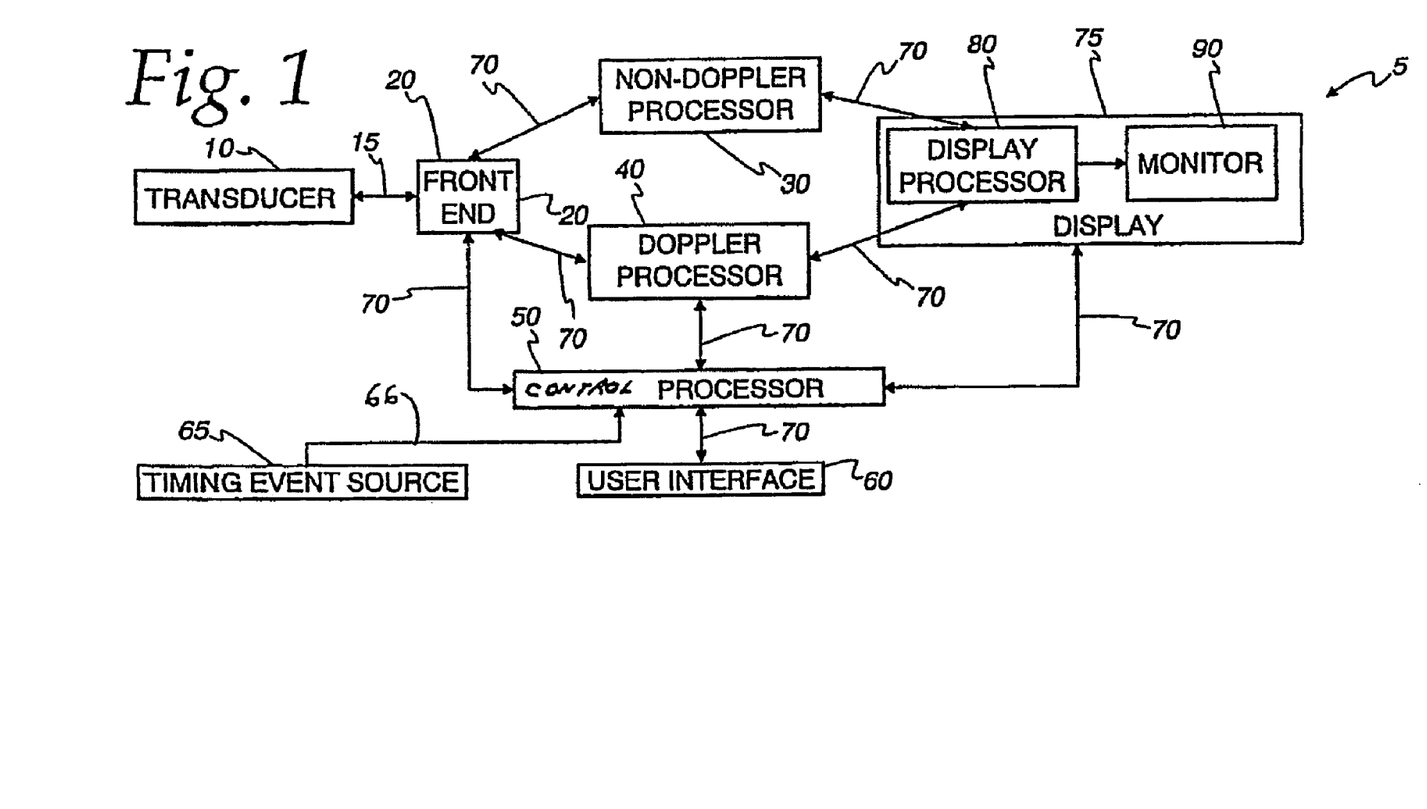
FIG. 1 illustrates a block diagram of an embodiment of an ultrasound machine or device adapted to perform color flow imaging in accordance with certain embodiments of the present invention.

FIG. 1 illustrates an embodiment of an ultrasound machine, generally designated 5, in accordance with embodiments of the present invention. A transducer 10 (including a probe for example) transmits ultrasound waves into a subject (live tissue for example) by converting electrical analog signals to ultrasonic energy and receives the ultrasound waves backscattered from the subject by converting ultrasonic energy to analog electrical signals. A front-end 20, that in one embodiment comprises a receiver, transmitter, and beamformer, may be used to create the necessary transmitted waveforms, beam patterns, receiver filtering techniques, and demodulation schemes that are used for the various imaging modes. Front-end 20 performs such functions, converting digital data to analog data and vice versa. Front-end 20 interfaces to transducer 10 using analog interface 15 and interfaces to a non-Doppler processor 30, a Doppler processor 40 and a control processor 50 over a bus 70 (digital bus for example). Bus 70 may comprise several digital sub-buses, each sub-bus having its own unique configuration and providing digital data interfaces to various parts of the ultrasound machine 5.

Non-Doppler processor 30 is, in one embodiment, adapted to provide amplitude detection functions and data compression functions used for imaging modes such as B-mode, M-mode, and harmonic imaging. Doppler processor 40, in one embodiment provides clutter filtering functions and movement parameter estimation functions used for imaging modes such as tissue velocity imaging (TVI), strain rate imaging (SRI), and color M-mode and B-mode. In one embodiment, the two processors, 30 and 40, accept digital signal data from the front-end 20, process the digital signal data into estimated parameter values, and pass the estimated parameter values to processor 50 and a display 75 over digital bus 70. The estimated parameter values may be created using the received signals in frequency bands centered at the fundamental, harmonics, or sub-harmonics of the transmitted signals in a manner known to those skilled in the art.

Display 75 is adapted, in one embodiment, to provide scan-conversion functions, color mapping functions, and tissue/flow arbitration functions, performed by a display processor 80 which accepts digital parameter values from processors 30, 40, and 50, processes, maps, and formats the digital data for display, converts the digital display data to analog display signals, and communicate the analog display signals to a monitor 90. Monitor 90 accepts the analog display signals from display processor 80 and displays the resultant image.

A user interface 60 enables user commands to be input by the operator to the ultrasound machine 5 through control processor 50. User interface 60 may comprise a keyboard, mouse, switches, knobs, buttons, track balls, foot pedals, a microphone for inputting voice commands and on-screen menus, among other devices.

A timing event source 65 generates a cardiac timing event signal 66 that represents the cardiac waveform of the subject. The timing event signal 66 is input to ultrasound machine 5 through control processor 50.

In one embodiment, control processor 50 comprises the main, central processor of the ultrasound machine 5, interfacing to various other parts of the ultrasound machine 5 through digital bus 70. Control processor 50 executes the various data algorithms and functions for the various imaging and diagnostic modes. Digital data and commands may be communicated between control processor 50 and other various parts of the ultrasound machine 5. As an alternative, the functions performed by control processor 50 may be performed by multiple processors, or may be integrated into processors 30, 40, or 80, or any combination thereof. As a further alternative, the functions of processors 30, 40, 50, and 80 may be integrated into a single PC backend.

Figure 2:
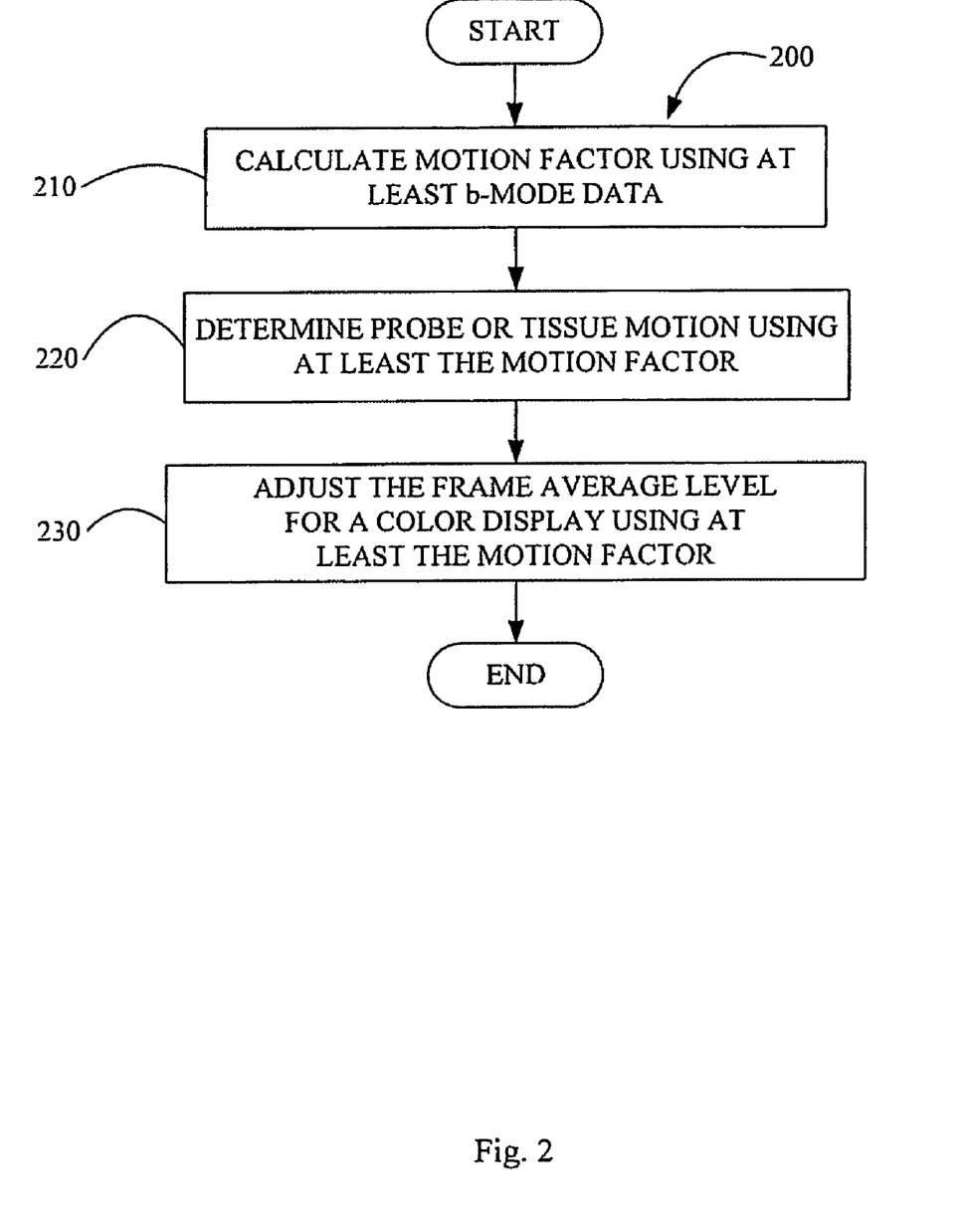
FIG. 2 illustrates a high level flow diagram depicting a method for performing frame averaging in an ultrasound machine or device adapted to perform color flow imaging (similar to that illustrated in FIG. 1) in accordance with certain embodiments of the present invention.

FIG. 2 illustrates a high level flow diagram depicting a method for performing adaptive frame averaging, generally designated 200, in an ultrasound machine or device adapted to perform color flow imaging (similar to that illustrated in FIG. 1) in accordance with certain embodiments of the present invention. In at least one embodiment of the present method 200, Step 210 comprises calculating a motion factor using at least b-mode data (one b-mode image frame for example). Step 220 comprises determining motion (of a probe or tissue for example) using at least the motion factor. Step 230 comprise adjusting the frame averaging level of a color display using at least the motion factor.

Figure 3:
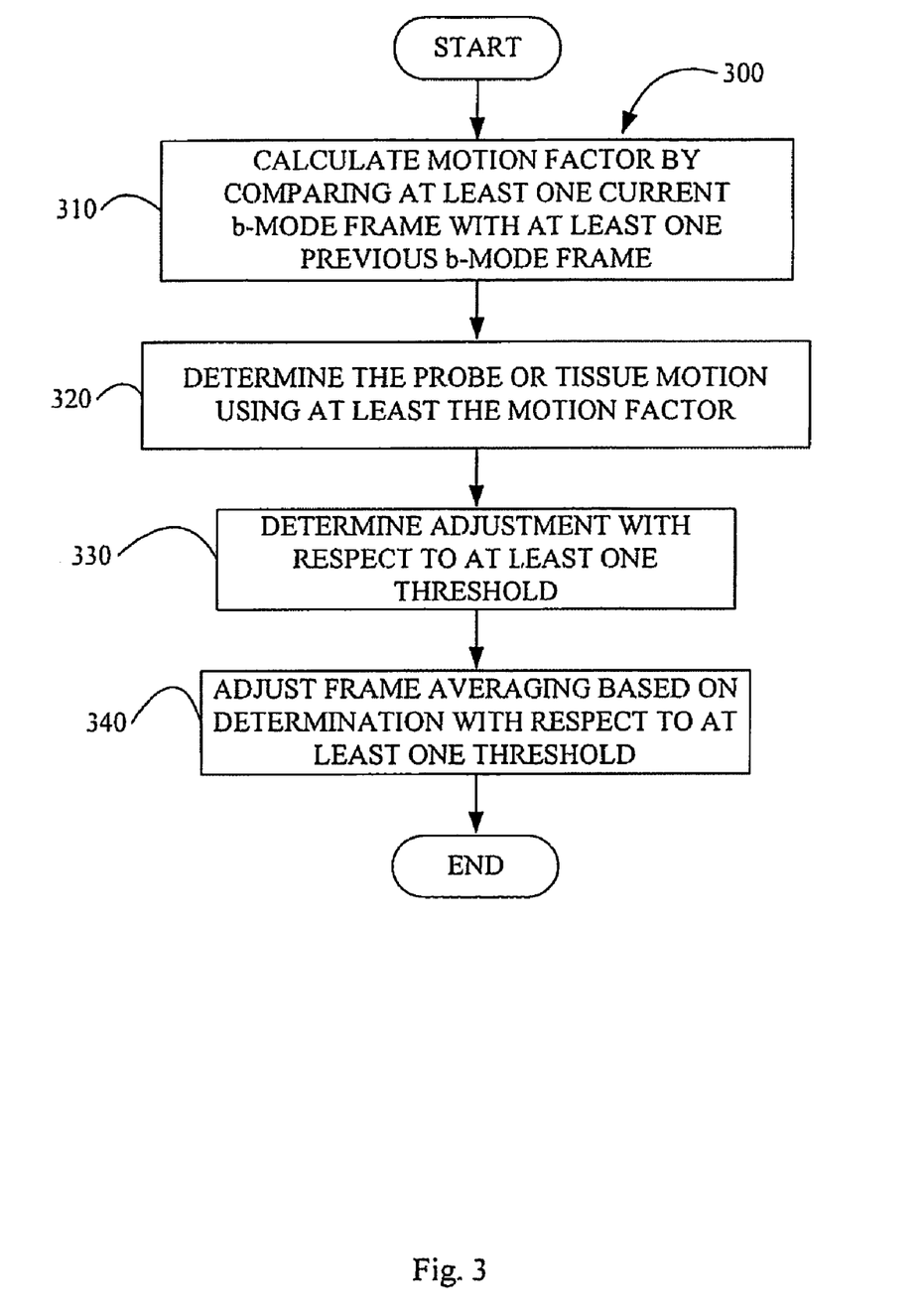
FIG. 3 illustrates a flow diagram depicting a method for performing frame averaging in an ultrasound machine or device adapted to perform color flow imaging (similar to that illustrated in FIG. 1) in accordance with certain embodiments of the present invention.

In at least one embodiment of the present invention, motion adaptive frame averaging for color flow images may be used to overcome lag and smearing alias of color created by motion. FIG. 3 illustrates a flow diagram depicting a method, generally designated 300, for performing such motion adaptive frame averaging in an ultrasound machine or device adapted to perform color flow imaging (similar to that illustrated in FIG. 1) in accordance with certain embodiments of the present invention. In one embodiment, an algorithm or equation may be used to perform such frame averaging.

In at least one embodiment of method 300, Step 310 comprises calculating motion factor from the b-mode image frames by comparing at least one current b-mode frame with at least one previous b-mode frame. In at least one embodiment, the current b-mode frame is compared with more than one previous b-mode frame (using an equation for example).

Step 320 comprises determining the probe and/or tissue motion using at least the motion factor. It is contemplated that, in at least one embodiment, the motion factor determines or measures the b-mode gray scale image change between the current frame and one or more previous frames. Such change is a good estimate of the probe or tissue movement. In particular, the motion factor may be calculated from the region of interest (alternatively referred to as the "ROI") of the color flow.

In at least one embodiment, this motion factor may then be used to adjust the frame average level for the color display. Step 330 comprises determining if an adjustment is required. In the illustrated embodiment, such adjustment determination is made with respect to at least one threshold. More specifically, in at least one embodiment, such adjustment may be made by determining if the motion factor is above or below at least one predetermined threshold. Step 340 comprises adjusting the frame averaging based, at least in part, on such determination. In at least one embodiment, such adjustment may comprise increasing, decreasing or not adjusting the level of the frame averaging. It is further contemplated that, in at least one embodiment, the at least one predetermined threshold may be set such that, if motion factor is at certain level (i.e., the motion factor is at or above a second predetermined threshold different from the first predetermined threshold), the frame averaging is turned off. Turning off the frame averaging removes lags and smearing when strong motion is present.

Figure 4:
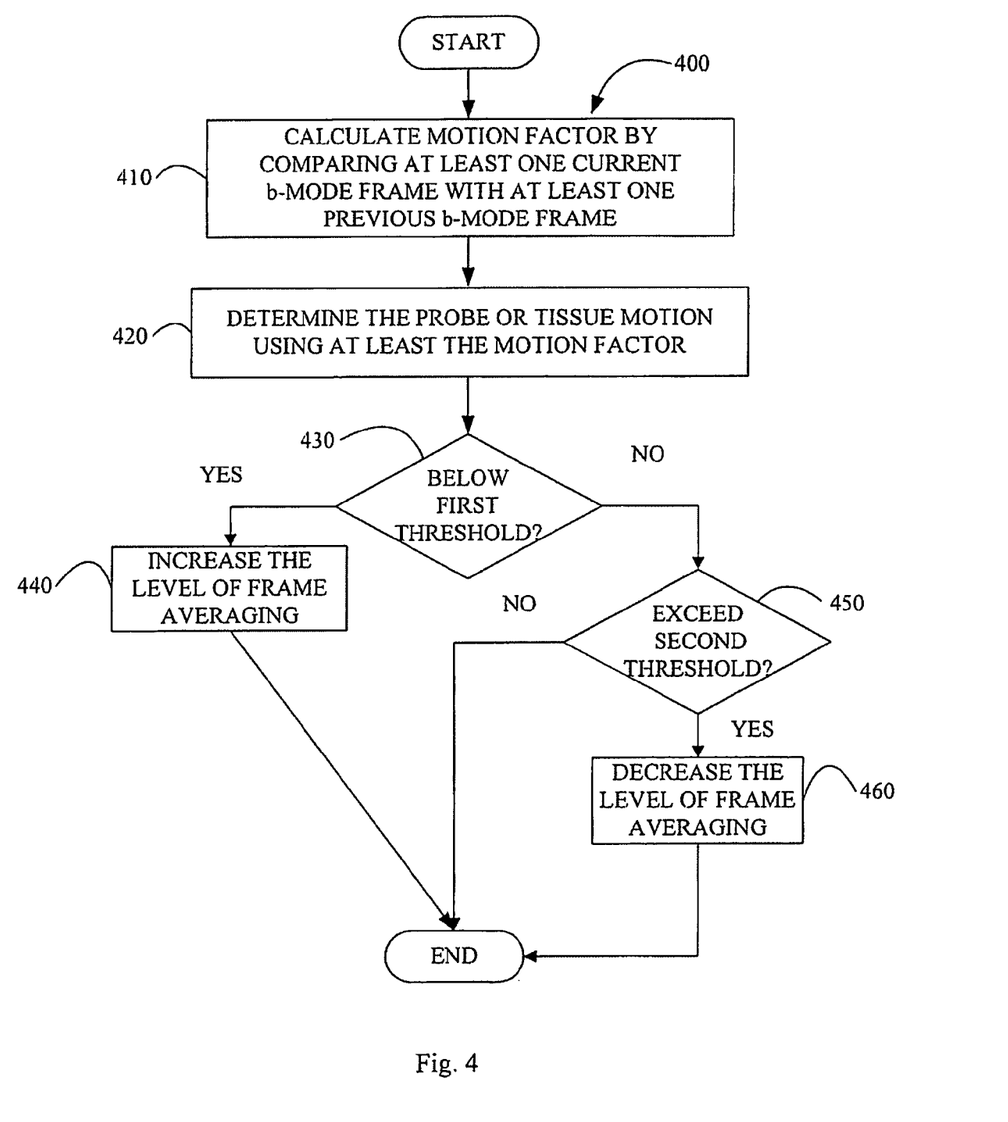
FIG. 4 illustrates a detailed flow diagram depicting a method for performing frame averaging in an ultrasound machine or device adapted to perform color flow imaging (similar to that illustrated in FIG. 1) in accordance with certain embodiments of the present invention.

In at least one embodiment of the present invention, motion adaptive frame averaging for color flow images may be used to overcome at least lag and smearing alias of color created by motion. FIG. 4 illustrates a detailed flow diagram depicting a method, generally designated 400, for performing such motion adaptive frame averaging in an ultrasound machine or device adapted to perform color flow imaging for example (similar to that illustrated in FIG. 1) in accordance with certain embodiments of the present invention. In at least one embodiment, an algorithm or equation may be used to perform such frame averaging.

In at least one embodiment of method 400, Step 410 comprises calculating motion factor from the b-mode image frames by comparing at least one current b-mode frame with at least one previous b-mode frame. In at least one embodiment, the current b-mode frame is compared with more than one previous b-mode frame (using an equation for example).

Step 420 comprises determining the probe and/or tissue motion using at least the motion factor. It is contemplated that, as provided previously, the motion factor determines or measures the b-mode gray scale image change between a current frame and one or more previous frames. Such change is a good estimate of the probe or tissue movement, as provided previously. In particular, the motion factor may be calculated from the ROI of the color flow.

The motion factor may be used to adjust the frame average level for the color display. Step 430 comprises determining if the motion factor is above or below a predetermined threshold. More specifically, in at least this embodiment, Step 430 comprises determining if the motion factor is below or less than a first predetermined threshold (a low threshold for example). If the motion factor is below or less than the first predetermined threshold (i.e., the motion factor is small), Step 440 comprises increasing a level of the frame averaging.

If the motion factor is not below or less than the first predetermined threshold, Step 450 comprises determining if the motion factor exceeds or is greater than a second predetermined threshold (a high threshold for example). If the motion factor is greater than or exceeds the second predetermined threshold (i.e., the motion factor is large), Step 460 comprises reducing the level of frame averaging to avoid at least lag and color alias caused by probe or tissue motion. In at least one embodiment, if the motion factor does not exceed the second threshold, method 400 comprises not changing or effecting the level of frame averaging (i.e., the frame averaging is maintained at the same level).

It is further contemplated that, in at least one embodiment, at least one predetermined threshold (if not both) may be set such that if motion factor is greater than or exceeds the second predetermined threshold by a certain amount (i.e., the motion factor is at or above the second predetermined threshold by a certain amount) the frame averaging is turned off. Turning off the frame averaging may remove the lag and smearing when strong motion is present.

Figure 5:
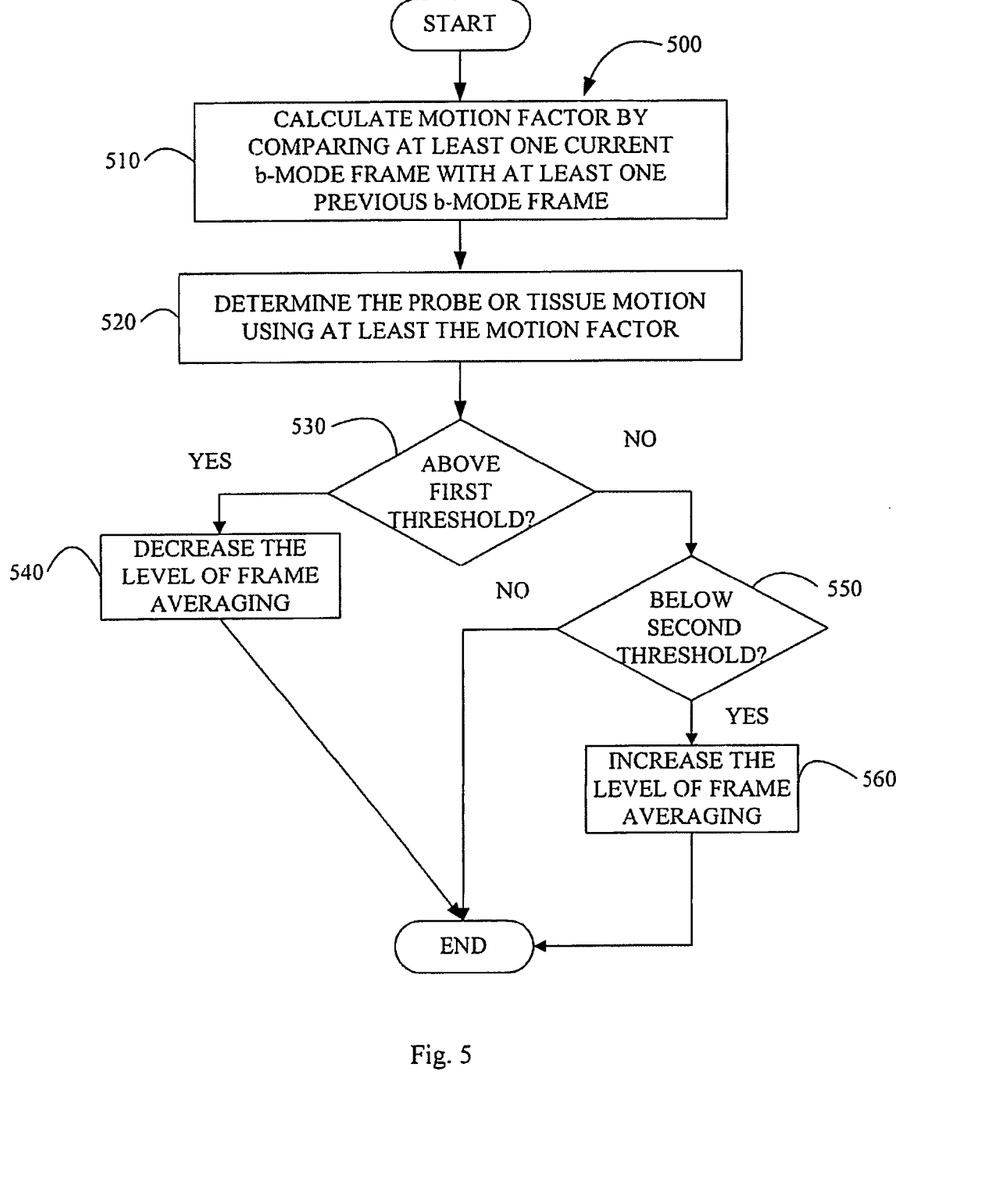
FIG. 5 illustrates another detailed flow diagram depicting a method for performing frame averaging in an ultrasound machine or device adapted to perform color flow imaging (similar to that illustrated in FIG. 1) in accordance with certain embodiments of the present invention.

In at least one embodiment of the present invention, motion adaptive frame averaging for color flow images may be used to overcome at least lag and smearing alias of color created by motion. FIG. 5 illustrates a detailed flow diagram depicting a method, generally designated 500, for performing such motion adaptive frame averaging in an ultrasound machine or device for example adapted to perform color flow imaging for example (similar to that illustrated in FIG. 1) in accordance with certain embodiments of the present invention. In at least one embodiment, an algorithm or equation may be used to perform such frame averaging.

In at least one embodiment of method 500, Step 510 comprises calculating motion factor from the b-mode image frames by comparing at least one current b-mode frame with at least one previous b-mode frame. In at least one embodiment, the current b-mode frame is compared with more than one previous b-mode frame (using an equation for example).

Step 520 comprises determining the probe and/or tissue motion using at least the motion factor. It is contemplated that, as provided previously, the motion factor determines or measures the b-mode gray scale image change between a current frame and one or more previous frames. In particular, the motion factor may be calculated from the ROI of the color flow.

The motion factor may used to adjust the frame average level for the color display. Step 530 comprises determining if the motion factor is above or below a predetermined threshold. More specifically, in at least this embodiment, Step 530 comprises determining if the motion factor is greater than or exceeds a first predetermined threshold (a high low threshold for example). If the motion factor exceeds or is greater than the first threshold (i.e., the motion factor is large), Step 540 comprises decreasing the level of the frame averaging.

If the motion factor is not greater than or exceeds the first predetermined threshold, Step 550 comprises determining if the motion factor is less than or falls below a second predetermined threshold (a low threshold for example). If the motion factor is less than or falls below the second predetermined threshold (i.e., the motion factor is small), Step 560 comprises increasing the level of frame averaging to avoid at least lag and color alias caused by probe or tissue motion. In at least one embodiment, if the motion factor does not exceed the second predetermined threshold, method 500 comprises not changing or effecting the level of frame averaging (i.e., the frame averaging is maintained at the same level).

It is further contemplated that, in at least one embodiment, at least one predetermined threshold (if not both) may be set such that if motion factor is greater than or exceeds the first predetermined threshold by a certain amount (i.e., the motion factor is at or above the first predetermined threshold by a certain amount, the frame averaging is turned off. Turning off the frame averaging removes lags and smearing when strong motion is present.

In at least one embodiment of the present invention, adjusting the frame averaging depends, at least in part, on a frame averaging equation, similar to that provided below. For example, if the frame averaging is implemented as a simple arithmetic mean operation, then with a number of previous frames. In at least one embodiment, the frame averaging level of the FIR or IIR filters may be adjusting or changing the number of frames involved. It is further contemplated that the frame averaging level of the FIR or IIR filters may be also adjusted or modified by changing or adjusting the filter coefficient, alone or in combination with adjusting or changing the number of frames.

It is contemplated that, in at least one embodiment, the equation is sensitive and responsive to motion, having a response time of about ¹⁄₁₀ to about ¹⁄₂₀ seconds as the b-mode frame rate is usually about 10 to about 20 Hz. The motion factor may be stored in a system memory of the scanner. In one embodiment, the motion factor may be stored in a separate stand alone memory or in or on a component of the system or device 5 (processor 50 for example).

In one embodiment, the stored motion is updated using the b-mode display subsystem, and is read by the color display subsystem. It is contemplated that the b-mode and color display subsystems may be hardware components that are part of the ultrasound system or device 5 similar to that discussed previously, or software running on the system 5 (on processor 50 for example).

It should be appreciated that in at least one embodiment, B-mode display generally changes only with tissue or probe movement. Thus using B-mode display data to calculate the motion factor provides a good estimate of the true motion of the probe and/or the tissue. However, other methods may be used for calculating the motion factor. One embodiment of the present invention comprises calculating the motion factor using color frame data.

In at least one embodiment of the present invention, motion factor may be calculated using at least one b-mode frame, more particularly at least two b-mode frames. In at least one embodiment of the invention, an equation is used to calculate the sum of absolute differences (alternatively referred to as "SAD"):

$$M = \frac{\sum |X_i - X_{i-1}|}{\sum |X_i|}$$

Where $X_i, X_{i-1}$ are the grayscale pixel values of current and previous b-mode frames.

This equation may be used to calculate the motion factor, which in turn may be used to reduce and/or remove color lag and smearing caused by probe and tissue motion. It should be appreciated that motion factor calculated using the equation has a fast response time and is sensitivity to motion, since, in at least one embodiment, the motion factor is calculated for every frame of the b-mode data, where the b-mode frame rate is about 10 to about 20 Hz. Therefore, the response time to sudden motion is about ¹⁄₂₀ to about ¹⁄₁₀ seconds. When no motion is detected, the equation automatically increases the level for frame average, thus further increase SNR and color persistency.

It is contemplated that, in at least one embodiment, the equation is sensitive and responsive to motion, having a response time of about 1/10 to about 1/20 seconds as the b-mode frame rate is usually about 10 to about 20 Hz. The motion factor may be stored in a system memory of the scanner. In one embodiment, the motion factor may be stored in a separate stand alone memory or in or on a component of the system or device 5 (processor 50 for example).

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for performing frame averaging in a device that produces at least one color flow image comprising:
   calculating a motion factor using at least b-mode data;
   determining motion using at least said motion factor, said motion factor being representative of an estimate of said motion; and
   adjusting said frame averaging using at least said motion factor by comparing said motion factor to first and second thresholds and
      increasing a number of frames included in said frame averaging if said motion factor is less than said first threshold,
      decreasing said number of frames included in said frame averaging if said motion factor is greater than said second threshold, said second threshold being greater than said first threshold, and
      turning off said frame averaging if said motion factor exceeds said second threshold by a predetermined amount.

2. The method of claim 1 wherein calculating said motion factor comprises using at least one current b-mode frame.

3. The method of claim 1 wherein calculating said motion factor comprises using at least one previous b-mode frame.

4. The method of claim 1 wherein calculating said motion factor comprises using an equation to determine said motion factor.

5. The method of claim 4 wherein said equation is used to calculate a sum of absolute differences between at least two b-mode frames.

6. The method of claim 4 wherein said equation comprises $$M = \frac{\sum |X_i - X_{i-1}|}{\sum |X_i|},$$

where $X_i, X_{i-1}$ comprise the grayscale pixel values of current and previous b-mode frames.

7. The method of claim 1 wherein said motion factor is calculated for at least one region of interest.

8. A method for performing frame averaging in an ultrasound device performing color flow imaging, comprising:
   calculating a motion factor by comparing at least one current b-mode frame with at least one previous b-mode frame;
   determining motion using at least said motion factor, said motion factor being representative of an estimate of said motion;
   increasing a level of frame averaging if said motion factor is below a first predetermined threshold by increasing a number of frames included in said level of frame averaging;
   decreasing said level of frame averaging if said motion factor is above a second predetermined threshold by decreasing said number of frames included in said level of frame averaging, said second predetermined threshold being greater than said first predetermined threshold; and
   turning off said frame averaging if said motion factor is above said second threshold by a predetermined amount.

9. The method of claim 8 comprising using an equation to determine said motion factor.

10. The method of claim 9 wherein said equation is used to calculate a sum of absolute differences between at least two b-mode frames.

11. The method of claim 9 wherein said equation comprises $$M = \frac{\sum |X_i - X_{i-1}|}{\sum |X_i|},$$

and wherein $X_i, X_{i-1}$ are the grayscale pixel values of current and previous b-mode frames.

12. An ultrasound apparatus for generating color flow imaging responsive to moving tissue comprising:
   a front-end arranged to transmit ultrasound waves into the moving tissue, and to generate received signals in response to the ultrasound waves backscattered from the moving tissue; and
   at least one processor responsive to the received signals, said processor calculating a motion factor by comparing at least one current b-mode frame with at least one previous b-mode frame, determining motion using at least said motion factor, said motion factor representative of an estimate of said motion, increasing a level of frame averaging if said motion factor is below a first predetermined threshold by increasing a number of frames included in said level of frame averaging, decreasing said level of frame averaging if said motion factor is above a second predetermined threshold by decreasing said number of frames included in said level of frame averaging, and turninig off said frame averaging if said motion factor exceeds said second predetermined threshold by a predetermined amount,
   wherein said second predetermined threshold is greater than said first predetermined threshold.

13. The apparatus of claim 12 further comprising a front end adapted to transmit ultrasound waves into tissue and generate received signals in response to ultrasound waves backscattered from said tissue.

14. The apparatus of claim 12 wherein said at least one processor is adapted to calculate said motion factor using an equation.

* * * * *

UNITED STATES PATENT AND TRADEMARK OFFICE
CERTIFICATE OF CORRECTION

PATENT NO. : 7,153,268 B2
APPLICATION NO. : 10/937529
DATED : December 26, 2006
INVENTOR(S) : Yadong Li, Richard Chiao and David Dubberstein It is certified that error appears in the above-identified patent and that said Letters Patent is hereby corrected as shown below:

In col. 8, line 59, after the word "that" and before "motion", insert --the--;
In col. 8, line 60, delete "sensitivity" and insert --sensitive--;
In col. 8, line 67, delete "increase" and insert --increasing--.

Signed and Sealed this

Twentieth Day of October, 2009

David J. Kappos
*Director of the United States Patent and Trademark Office*